(12) United States Patent
Liu et al.

(10) Patent No.: US 10,575,300 B2
(45) Date of Patent: Feb. 25, 2020

(54) BANDWIDTH CONTROL METHOD AND BANDWIDTH CONTROL DEVICE

(71) Applicant: HUAWEI TECHNOLOGIES CO., LTD., Shenzhen, Guangdong (CN)

(72) Inventors: Xiaodong Liu, Beijing (CN); Ying Jiang, Beijing (CN); Xiaopeng Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 440 days.

(21) Appl. No.: 15/294,030

(22) Filed: Oct. 14, 2016

(65) Prior Publication Data

US 2017/0034820 A1    Feb. 2, 2017

Related U.S. Application Data

(63) Continuation of application No. PCT/CN2014/088782, filed on Oct. 17, 2014.

(30) Foreign Application Priority Data

Apr. 17, 2014 (CN) .......................... 2014 1 0156088

(51) Int. Cl.
*H04W 4/00* (2018.01)
*H04W 72/04* (2009.01)
(Continued)

(52) U.S. Cl.
CPC ..... *H04W 72/0446* (2013.01); *H04L 12/4633* (2013.01); *H04W 28/02* (2013.01);
(Continued)

(58) Field of Classification Search
None
See application file for complete search history.

(56) References Cited

U.S. PATENT DOCUMENTS

2004/0062273 A1    4/2004   Frank et al.
2006/0187942 A1*   8/2006   Mizutani ............ H04L 47/2408
                                                            370/401
(Continued)

FOREIGN PATENT DOCUMENTS

CN           1518279 A      8/2004
CN         102158390 A      8/2011
(Continued)

OTHER PUBLICATIONS

Chinese Office Action dated Jun. 27, 2017 in corresponding Chinese Patent Application No. 201410156088.6.
(Continued)

*Primary Examiner* — Gerald A Smarth
(74) *Attorney, Agent, or Firm* — Conley Rose, P.C.

(57) ABSTRACT

Embodiments of the present application disclose a bandwidth control method and a bandwidth control device. The method includes: obtaining, by a bandwidth control device, an access request of a mobile terminal, where the access request is used to indicate that the mobile terminal requests to access the Internet by using a home gateway of a fixed terminal; obtaining, by the bandwidth control device, a first bandwidth of the fixed terminal, where the first bandwidth is a subscribed bandwidth of the fixed terminal; and adjusting, by the bandwidth control device, a bandwidth allocated to the fixed terminal from the subscribed bandwidth of the fixed terminal to a second bandwidth, where the second bandwidth is greater than the first bandwidth. In the embodiments of the present application, the impact of mobile terminal access on user experience of the fixed terminal can be reduced.

15 Claims, 7 Drawing Sheets

(51) Int. Cl.
*H04W 28/02* (2009.01)
*H04W 28/20* (2009.01)
*H04L 12/46* (2006.01)
*H04W 48/14* (2009.01)

(52) U.S. Cl.
CPC ........... *H04W 28/20* (2013.01); *H04W 48/14* (2013.01); *H04W 72/0486* (2013.01)

(56) References Cited

U.S. PATENT DOCUMENTS

| | | | | |
|---|---|---|---|---|
| 2007/0201540 | A1* | 8/2007 | Berkman | H04B 3/542 375/219 |
| 2009/0023458 | A1* | 1/2009 | Mountney | H04W 16/14 455/456.1 |
| 2009/0180430 | A1 | 7/2009 | Fadell | |
| 2010/0278141 | A1* | 11/2010 | Choi-Grogan | H04W 4/90 370/331 |
| 2013/0091279 | A1 | 4/2013 | Haddad et al. | |
| 2013/0124719 | A1* | 5/2013 | Espinosa | H04L 41/5025 709/224 |
| 2014/0140213 | A1* | 5/2014 | Raleigh | H04L 41/0893 370/235 |
| 2014/0219156 | A1* | 8/2014 | Weaver | H04W 4/06 370/312 |
| 2014/0341109 | A1* | 11/2014 | Cartmell | H04L 45/308 370/328 |
| 2015/0229584 | A1* | 8/2015 | Okamoto | H04L 12/5692 709/226 |
| 2015/0244723 | A1 | 8/2015 | Liang et al. | |
| 2015/0249622 | A1* | 9/2015 | Phillips | H04L 65/4084 709/219 |
| 2015/0296547 | A1* | 10/2015 | Liu | H04W 16/26 455/449 |
| 2016/0036685 | A1* | 2/2016 | Paclik | H04L 41/0896 375/225 |
| 2017/0289122 | A1* | 10/2017 | Gunasekara | H04L 63/102 |

FOREIGN PATENT DOCUMENTS

| | | |
|---|---|---|
| CN | 102202001 A | 9/2011 |
| CN | 102238648 A | 11/2011 |
| CN | 103002443 A | 3/2013 |
| CN | 103269493 A | 8/2013 |
| CN | 103297964 A | 9/2013 |
| CN | 103391585 A | 11/2013 |
| CN | 103685201 A | 3/2014 |
| CN | 103957566 A | 7/2014 |
| EP | 2 254 292 A1 | 11/2010 |
| WO | 2009/029009 A1 | 3/2009 |

OTHER PUBLICATIONS

International Search Report dated Jan. 20, 2015 from International Patent Application No. PCT/CN2014/088782.
Chinese Office Action dated Nov. 3, 2016 from Chinese Patent Application No. 201410156088.6.
Extended European Search Report dated Mar. 17, 2017 from European Patent Application No. 14889318.3.
Rigney et al., "Remote Authentication Dial in User Service (RADIUS)", Network Working Group, Jan. 1997, pp. 1-64.
International Search Report, dated Jan. 20, 2015, in corresponding International Application No. PCT/CN2014/088782 (4 pp.).

* cited by examiner

BANDWIDTH CONTROL METHOD AND BANDWIDTH CONTROL DEVICE

CROSS-REFERENCE TO RELATED APPLICATIONS

This application is a continuation of International Application No. PCT/CN2014/088782, filed on Oct. 17, 2014, which claims priority to Chinese Patent Application No. 201410156088.6, filed on Apr. 17, 2014. The disclosures of the aforementioned applications are hereby incorporated by reference in their entireties.

TECHNICAL FIELD

The present application relates to the field of mobile communications, and in particular, to a bandwidth control method and a bandwidth control device.

BACKGROUND

As mobile broadband users and data service traffic increase rapidly, a rate of a traditional cellular network gradually becomes a bottleneck in mobile broadband development. Mobile broadband transmission features high costs, while a Wireless Local Area Network (Wireless Local Area Network, WLAN) is widely used in finance, healthcare, manufacturing, and other industries thanks to unique charms such as a low price, flexible networking, support for high-speed wireless data access, and an open frequency band. More and more network operators regard the WLAN as a supplement to a 2G/3G mobile network.

Wireless Fidelity (Wireless Fidelity, Wi-Fi) offloading means that mobile operators allow, by cooperating with a third party or constructing a WLAN by themselves, intra-network mobile users to use the WLAN, so as to achieve objectives of offloading data traffic on a mobile network, reducing an operating expense, and mitigating capacity expansion pressure. Currently, a main solution for the operators to construct a Wi-Fi offload network is constructing a public Wi-Fi hotspot by themselves. The solution features a large investment and limited hotspot coverage, and therefore cannot meet an offload requirement of the operators. Most operators have rich fixed broadband user resources. If the Wi-Fi offload network is constructed by using a fixed broadband user network, that is, a solution of hosting a Wi-Fi offload hotspot in a fixed broadband user is adopted, a lot of investments in new network construction can be saved for an operator, and problems such as difficulty in setting up a Wi-Fi hotspot and a failure in achieving large area coverage can be resolved.

In the solution, an operator adds a public Wi-Fi hotspot to a home gateway of a fixed broadband user by reconstructing a home gateway device of the user, and Wi-Fi data of a mobile user is returned to a Wi-Fi offload gateway of the operator over a fixed broadband access network by establishing a Soft-GRE tunnel between the home gateway and the Wi-Fi offload gateway, thereby implementing offloading of mobile user traffic. This may effectively resolve problems of insufficient Wi-Fi hotspot coverage and a large investment in constructing a new bearer network.

However, in the technology, the Wi-Fi offload hotspot is hosted in the home gateway device of the fixed broadband user, and therefore, service traffic needs to be carried by using a broadband connection of the fixed broadband user. This inevitably occupies a bandwidth of the broadband user and affects user experience of a hosting user.

SUMMARY

Embodiments of the present application provide a bandwidth control method and a bandwidth control device to reduce impact of mobile terminal access on user experience of a fixed terminal.

A first aspect of an embodiment of the present application provides a bandwidth control method, including:

obtaining, by a bandwidth control device, an access request of a mobile terminal, where the access request is used to indicate that the mobile terminal requests to access the Internet by using a home gateway of a fixed terminal;

obtaining, by the bandwidth control device, a subscribed bandwidth of the fixed terminal; and adjusting, by the bandwidth control device, a bandwidth allocated to the fixed terminal from the subscribed bandwidth of the fixed terminal to a second bandwidth, where the second bandwidth is greater than the subscribed bandwidth of the fixed terminal.

With reference to the first aspect of the embodiment of the present application, in a first implementation manner of the first aspect of the embodiment of the present application, the method further includes: controlling, by the bandwidth control device, a bandwidth, which the fixed terminal is allowed to use, to be the subscribed bandwidth of the fixed terminal.

With reference to the first aspect of the embodiment of the present application, in a second implementation manner of the first aspect of the embodiment of the present application, the method further includes: obtaining, by the bandwidth control device, a subscribed bandwidth of each mobile terminal;

calculating, by the bandwidth control device, a first bandwidth according to the subscribed bandwidths of all the mobile terminals; and using, by the bandwidth control device, the sum of the subscribed bandwidth of the fixed terminal and the first bandwidth as the second bandwidth, or using, by the bandwidth control device, the sum of the subscribed bandwidth of the fixed terminal, the first bandwidth, and a redundant bandwidth as the second bandwidth.

With reference to the second implementation manner of the first aspect of the embodiment of the present application, in a third implementation manner of the first aspect of the embodiment of the present application, the calculating, by the bandwidth control device, a first bandwidth according to the subscribed bandwidths of all the mobile terminals includes:

selecting, by the bandwidth control device, a maximum subscribed bandwidth of a mobile terminal among the subscribed bandwidths of all the mobile terminals as the first bandwidth;

or using, by the bandwidth control device, a weighted value of the subscribed bandwidths of all the mobile terminals as the first bandwidth.

With reference to the second implementation manner of the first aspect of the embodiment of the present application or the third implementation manner of the first aspect, in a fourth implementation manner of the first aspect of the embodiment of the present application, controlling, by the bandwidth control device, a bandwidth, which each of all the mobile terminals is allowed to use, to be the subscribed bandwidth of the mobile terminal;

or controlling, by the bandwidth control device, the sum of bandwidths, which all the mobile terminals are allowed to use, to be a difference between the second bandwidth and the subscribed bandwidth of the fixed terminal.

With reference to the second implementation manner of the first aspect of the embodiment of the present application or the third implementation manner of the first aspect, in a fifth implementation manner of the first aspect of the embodiment of the present application, the obtaining, by the bandwidth control device, a subscribed bandwidth of each mobile terminal includes:

encapsulating and sending, by the bandwidth control device, an access request packet to a server; and receiving and parsing, by the bandwidth control device, an access permission packet that is from the server, where the access permission packet includes a bandwidth attribute of the mobile terminal, and the bandwidth attribute of the mobile terminal is used to indicate the subscribed bandwidth of the mobile terminal.

With reference to the fifth implementation manner of the first aspect of the embodiment of the present application, in a sixth implementation manner of the first aspect of the embodiment of the present application, the server is a Remote Authentication Dial In User Service RADIUS server.

A second aspect of an embodiment of the present application provides a bandwidth control device, including:

a first obtaining module, a second obtaining module, and an adjustment module, where:

the first obtaining module is configured to obtain an access request of a mobile terminal, where the access request is used to indicate that the mobile terminal requests to access the Internet by using a home gateway of a fixed terminal;

the second obtaining module is configured to obtain a subscribed bandwidth of the fixed terminal; and the adjustment module is configured to adjust a bandwidth allocated to the fixed terminal from the subscribed bandwidth of the fixed terminal to a second bandwidth, where the second bandwidth is greater than the subscribed bandwidth of the fixed terminal.

With reference to the second aspect of the embodiment of the present application, in a first implementation manner of the second aspect of the embodiment of the present application, the bandwidth control device further includes:

a first control module, configured to control a bandwidth, which the fixed terminal is allowed to use, to be the subscribed bandwidth of the fixed terminal.

With reference to the second aspect of the embodiment of the present application, in a second implementation manner of the second aspect of the embodiment of the present application, the bandwidth control device further includes:

a third obtaining module, configured to obtain a subscribed bandwidth of each mobile terminal; and a calculation module, configured to calculate a first bandwidth according to the subscribed bandwidths of all the mobile terminals, where the second bandwidth is the sum of the subscribed bandwidth of the fixed terminal and the first bandwidth, or the second bandwidth is the sum of the subscribed bandwidth of the fixed terminal, the first bandwidth, and a redundant bandwidth.

With reference to the second implementation manner of the second aspect of the embodiment of the present application, in a third implementation manner of the second aspect of the embodiment of the present application, the calculation module is specifically configured to select a maximum subscribed bandwidth of a mobile terminal among the subscribed bandwidths of all the mobile terminals as the first bandwidth;

or the calculation module is specifically configured to use a weighted value of the subscribed bandwidths of all the mobile terminals as the first bandwidth.

With reference to the second implementation manner of the second aspect of the embodiment of the present application or the third implementation manner of the second aspect, in a fourth implementation manner of the second aspect of the embodiment of the present application, the bandwidth control device further includes:

a second control module, configured to control a bandwidth, which each of all the mobile terminals is allowed to use, to be the subscribed bandwidth of the mobile terminal, or configured to control the sum of bandwidths, which all the mobile terminals are allowed to use, to be a difference between the second bandwidth and the subscribed bandwidth of the fixed terminal.

With reference to the second implementation manner of the second aspect of the embodiment of the present application or the third implementation manner of the second aspect, in a fifth implementation manner of the second aspect of the embodiment of the present application, the third obtaining module includes:

a first sending module, configured to encapsulate and send an access request packet to a server; and a first parsing module, configured to receive and parse an access permission packet that is from the server, where the access permission packet includes a bandwidth attribute of the mobile terminal, and the bandwidth attribute of the mobile terminal is used to indicate the subscribed bandwidth of the mobile terminal.

In the technical solutions of the embodiments of the present application, when a mobile terminal requests to access the Internet in a wireless manner by using a home gateway of a fixed terminal, a bandwidth allocated to the fixed terminal is dynamically adjusted, so that a bandwidth allocated to the fixed terminal is greater than the subscribed bandwidth of the fixed terminal, thereby reducing impact of mobile terminal user access on experience of a user that uses the fixed terminal In addition, compared with a solution of allocating a bandwidth greater than a subscribed bandwidth of a fixed terminal to the fixed terminal over a long period of time, the solutions of the embodiments of the present application avoid bandwidth waste caused on an access network of an operator when no mobile terminal performs accessing.

DESCRIPTION OF EMBODIMENTS

Embodiments of the present application provide a bandwidth control method and a bandwidth control device to reduce impact of mobile terminal access on user experience of a fixed terminal.

To make persons skilled in the art understand the technical solutions in the present application better, the following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

In the specification, claims, and accompanying drawings of the present application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
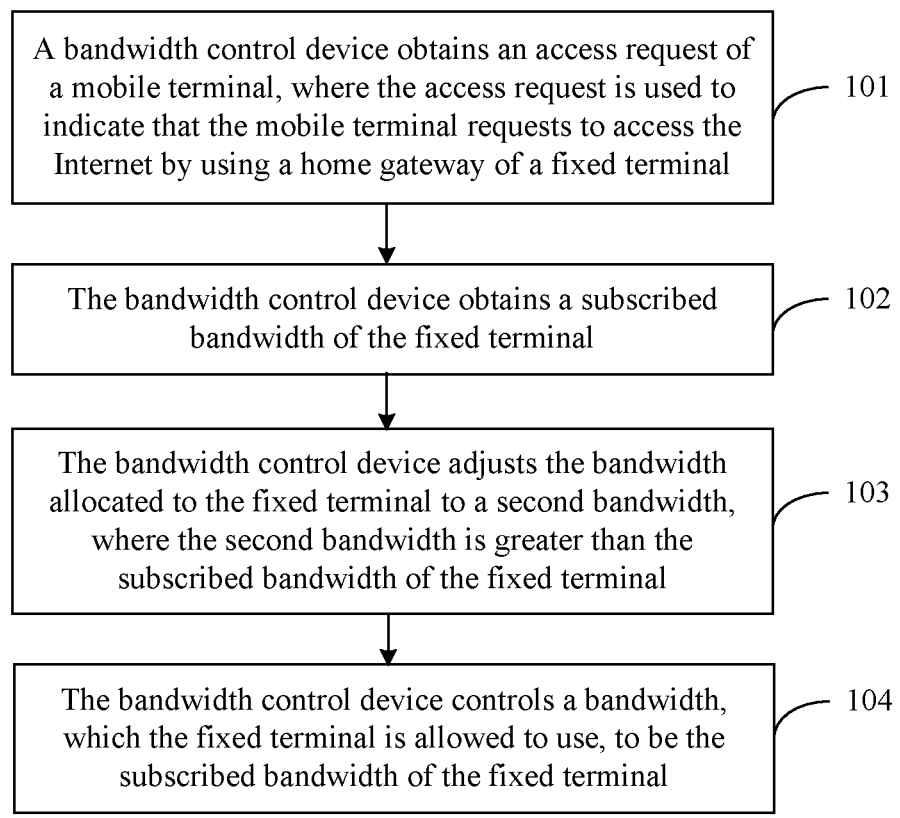
FIG. 1 is a flowchart of a bandwidth control method according to an embodiment of the present application.

Referring to FIG. 1, a bandwidth control method in an embodiment of the present application includes the following steps.

101. A bandwidth control device obtains an access request of a mobile terminal, where the access request is used to indicate that the mobile terminal requests to access the Internet by using a home gateway of a fixed terminal.

In this embodiment, the bandwidth control device may be a device used by an operator for bandwidth control. A public Wi-Fi hotspot of the operator is added to the home gateway of the fixed terminal. That is, the home gateway may return Wi-Fi data of a mobile user to a Wi-Fi offload gateway of the operator by using a fixed broadband access network, and then the Wi-Fi data is sent to the Internet by using the Wi-Fi offload gateway of the operator, so that the mobile terminal can access the Internet by using the home gateway of the fixed terminal. When a mobile terminal needs to access the Internet, the mobile terminal sends an access request to the bandwidth control device, where the access request is used to request to access the Internet by using the home gateway of the fixed terminal. The bandwidth control device obtains the access request of the mobile terminal. One or at least two mobile terminals may request to access the Internet by using the home gateway of the fixed terminal.

102. The bandwidth control device obtains a subscribed bandwidth of the fixed terminal.

An agreement has been signed between the fixed terminal and the operator, agreeing that the operator allocates a fixed available bandwidth to the home gateway of the fixed terminal, where the fixed available bandwidth is the subscribed bandwidth of the fixed terminal. If the available bandwidth allocated to the fixed terminal remains as the subscribed bandwidth of the fixed terminal, when requesting to access the Internet by using the home gateway of the fixed terminal, the mobile terminal may preempt the subscribed bandwidth of the fixed terminal and use a broadband connection of the fixed terminal to carry service traffic, thereby affecting experience of using the fixed terminal. To avoid impact on experience of using the fixed terminal, the bandwidth control device needs to adjust the bandwidth allocated to the fixed terminal. Prior to the adjustment, the bandwidth control device needs to obtain the subscribed bandwidth of the fixed terminal first.

103. The bandwidth control device adjusts a bandwidth allocated to the fixed terminal from the subscribed bandwidth of the fixed terminal to a second bandwidth, where the second bandwidth is greater than the subscribed bandwidth of the fixed terminal.

After obtaining the subscribed bandwidth of the fixed terminal, the bandwidth control device adjusts, according to the subscribed bandwidth of the fixed terminal, the bandwidth allocated to the fixed terminal, so that the bandwidth control device adjusts the bandwidth allocated to the fixed terminal from the subscribed bandwidth of the fixed terminal to the second bandwidth when a mobile terminal requests access, where the second bandwidth is greater than the subscribed bandwidth of the fixed terminal. The bandwidth control device adjusts the bandwidth allocated to the fixed terminal back to the subscribed bandwidth of the fixed terminal when no mobile terminal requests access.

In this embodiment, when a mobile terminal requests to access the Internet in a wireless manner by using a home gateway of a fixed terminal, a bandwidth allocated to the fixed terminal is dynamically adjusted, so that a bandwidth allocated to the fixed terminal is greater than the subscribed bandwidth of the fixed terminal, thereby reducing impact of mobile terminal user access on experience of a user that uses the fixed terminal In addition, compared with a solution of allocating a bandwidth greater than a subscribed bandwidth of a fixed terminal to the fixed terminal over a long period of time, the solution of this embodiment avoids bandwidth waste caused on an access network of an operator when no mobile terminal performs accessing.

In this embodiment, when a mobile terminal requests access, the bandwidth allocated by the bandwidth control device to the fixed terminal is greater than the subscribed bandwidth of the fixed terminal; in this case, resources actually used by the fixed terminal may be more than resources subscribed for the fixed terminal with the operator, that is, a bandwidth of the accessed mobile terminal may be preempted, thereby affecting user experience of the mobile terminal. Therefore, optionally, the bandwidth control method in this embodiment further includes:

104. The bandwidth control device controls a bandwidth, which the fixed terminal is allowed to use, to be the subscribed bandwidth of the fixed terminal.

When a mobile terminal performs accessing, the bandwidth allocated by the bandwidth control device to the fixed terminal is the second bandwidth. However, the bandwidth control device limits a bandwidth of the fixed terminal, so that a bandwidth that the fixed terminal can use is the subscribed bandwidth of the fixed terminal.

In this way, the fixed terminal can be prevented from preempting a bandwidth originally allocated by the bandwidth control device to the mobile terminal, thereby avoiding impact of the fixed terminal on user experience of the mobile terminal.

In this embodiment, the bandwidth control device adjusts the bandwidth allocated to the fixed terminal to the second bandwidth. In a practical application, multiple methods are available to calculate the second bandwidth. The following describes a bandwidth control method in an embodiment of the present application.

Figure 2:
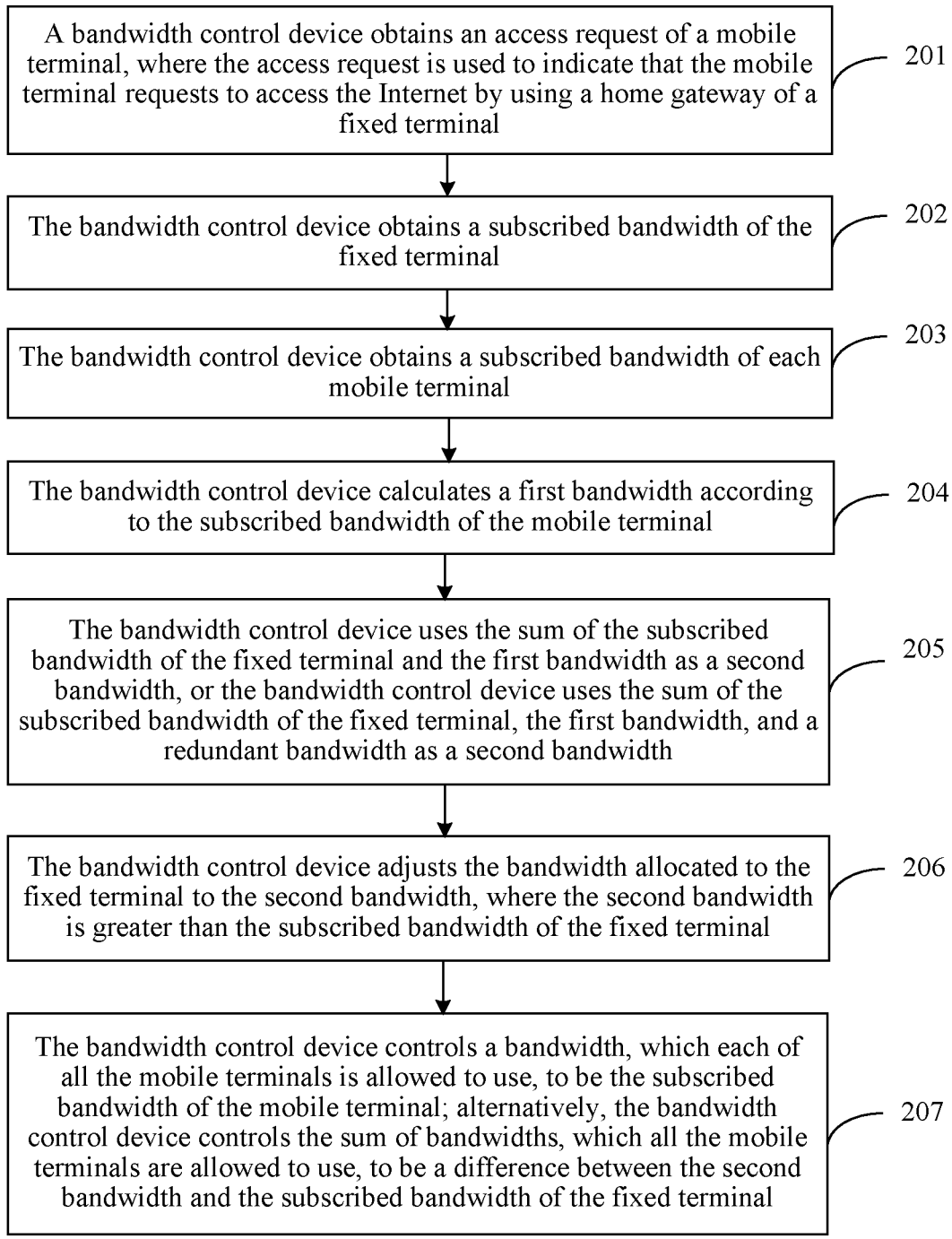
FIG. 2 is a flowchart of a bandwidth control method according to another embodiment of the present application.

Referring to FIG. 2, a bandwidth control method in another embodiment of the present application includes the following steps.

201. A bandwidth control device obtains an access request of a mobile terminal, where the access request is used to indicate that the mobile terminal requests to access the Internet by using a home gateway of a fixed terminal.

In this embodiment, the bandwidth control device may be a device used by an operator for bandwidth control. A public Wi-Fi hotspot of the operator is added to the home gateway of the fixed terminal. That is, the home gateway may return Wi-Fi data of a mobile user to a Wi-Fi offload gateway of the operator by using a fixed broadband access network, and then the Wi-Fi data is sent to the Internet by using the Wi-Fi offload gateway of the operator, so that the mobile terminal can access the Internet by using the home gateway of the fixed terminal. When a mobile terminal needs to access the Internet, the mobile terminal sends an access request to the bandwidth control device, where the access request is used to request to access the Internet by using the home gateway of the fixed terminal. The bandwidth control device obtains the access request of the mobile terminal. One or at least two mobile terminals may request to access the Internet by using the home gateway of the fixed terminal.

202. The bandwidth control device obtains a subscribed bandwidth of the fixed terminal.

An agreement has been signed between the fixed terminal and the operator, agreeing that the operator allocates a fixed available bandwidth to the home gateway of the fixed terminal, where the available bandwidth is the subscribed bandwidth of the fixed terminal. If the available bandwidth allocated to the fixed terminal remains as the subscribed bandwidth of the fixed terminal, when requesting to access the Internet by using the home gateway of the fixed terminal, the mobile terminal may preempt the subscribed bandwidth of the fixed terminal and use a broadband connection of the fixed terminal to carry service traffic, thereby affecting experience of using the fixed terminal. To avoid impact on experience of using the fixed terminal, the bandwidth control device needs to adjust the bandwidth allocated to the fixed terminal. Prior to the adjustment, the bandwidth control device needs to obtain the subscribed bandwidth of the fixed terminal first.

203. The bandwidth control device obtains a subscribed bandwidth of the mobile terminal.

An agreement has been signed between each mobile terminal and the operator, agreeing that the operator allocates a fixed available bandwidth to the mobile terminal, where the available bandwidth is the subscribed bandwidth of the mobile terminal. Subscribed bandwidths of different mobile terminals may be the same or may be different.

204. The bandwidth control device calculates a first bandwidth according to the subscribed bandwidth of the mobile terminal.

When adjusting the bandwidth allocated to the fixed terminal, the bandwidth control device needs to calculate the first bandwidth with reference to the subscribed bandwidth of the mobile terminal and then calculates a second bandwidth according to the first bandwidth and the subscribed bandwidth of the fixed terminal, so as to ensure user experience of the fixed terminal, avoid excessively occupying, by the mobile terminal, broadband connections of the fixed terminal due to a relatively large subscribed bandwidth of the mobile terminal or a relatively large quantity of mobile terminals, and ensure user experience of the mobile terminal.

Multiple methods are available for the bandwidth control device to calculate a first bandwidth according to subscribed bandwidths of all mobile terminals. For a specific example, the bandwidth control device selects a maximum subscribed bandwidth among the subscribed bandwidths of all the mobile terminals as the first bandwidth; alternatively, the bandwidth control device uses a weighted value of the subscribed bandwidths of all the mobile terminals as the first bandwidth. Certainly, the foregoing methods are used as examples only and do not impose a limitation.

Multiple methods are also available for the bandwidth control device to use the weighted value of the subscribed bandwidths of all the mobile terminals as the first bandwidth. For example, the bandwidth control device uses the sum of the subscribed bandwidths of all the mobile terminals as the first bandwidth. In a practical application, a maximum bandwidth used by each mobile terminal at the same time is not necessarily a subscribed bandwidth of the mobile terminal. Therefore, the first bandwidth may not be the sum of the subscribed bandwidths of all the mobile terminals but may be less than the sum of the subscribed bandwidths of these mobile terminals, that is, weighted values of subscribed bandwidths of at least some mobile terminals may be less than 1. Therefore, an average value of the subscribed bandwidths of all the mobile terminals may be used as the first bandwidth; alternatively, all the mobile terminals are graded according to the subscribed bandwidths of all the mobile terminals, and a weighted value of each mobile terminal is determined according to a grade of the mobile terminal, where a mobile terminal with a higher grade has a larger weighted value. In this way, waste caused because bandwidth resources of the operator are not used can be avoided.

205. The bandwidth control device uses the sum of the subscribed bandwidth of the fixed terminal and the first bandwidth as a second bandwidth, or the bandwidth control device uses the sum of the subscribed bandwidth of the fixed terminal, the first bandwidth, and a redundant bandwidth as a second bandwidth.

After obtaining the first bandwidth by calculation according to the subscribed bandwidths of all the mobile terminals, the bandwidth control device calculates the sum of the subscribed bandwidth of the fixed terminal and the first bandwidth, where the sum is used as the second bandwidth for adjusting the bandwidth of the fixed terminal In a practical application, the bandwidth control device may further add an extra bandwidth and allocate the extra bandwidth to the fixed terminal, that is, use the sum of the subscribed bandwidth of the fixed terminal, the first bandwidth, and the redundant bandwidth as the second bandwidth to adjust the bandwidth of the fixed terminal, so as to ensure user experience of each mobile terminal when a relatively large quantity of mobile terminals request access, where the redundant bandwidth may be preset by the bandwidth control device.

206. The bandwidth control device adjusts a bandwidth allocated to the fixed terminal from the subscribed bandwidth of the fixed terminal to the second bandwidth, where the second bandwidth is greater than the subscribed bandwidth of the fixed terminal.

After obtaining the subscribed bandwidth of the fixed terminal, the bandwidth control device adjusts, according to the subscribed bandwidth of the fixed terminal, the bandwidth allocated to the fixed terminal, so that the bandwidth control device adjusts the bandwidth allocated to the fixed terminal from the subscribed bandwidth of the fixed terminal to the second bandwidth when a mobile terminal requests access, where the second bandwidth is greater than the subscribed bandwidth of the fixed terminal. The bandwidth control device adjusts the bandwidth allocated to the fixed terminal back to the subscribed bandwidth of the fixed terminal when no mobile terminal requests access.

In this embodiment, when a mobile terminal requests to access the Internet in a wireless manner by using a home gateway of a fixed terminal, a bandwidth allocated to the fixed terminal is dynamically adjusted, so that a bandwidth allocated to the fixed terminal is greater than the subscribed bandwidth of the fixed terminal, thereby reducing impact of mobile terminal user access on experience of a user that uses the fixed terminal In addition, compared with a solution of allocating a bandwidth greater than a subscribed bandwidth of a fixed terminal to the fixed terminal over a long period of time, the solution of this embodiment avoids bandwidth waste caused on an access network of an operator when no mobile terminal performs accessing.

Further, the bandwidth control device calculates a first bandwidth according to subscribed bandwidths of all mobile terminals, uses the sum of the first bandwidth and the subscribed bandwidth of the fixed terminal or the sum of the first bandwidth, the subscribed bandwidth of the fixed terminal, and a redundant bandwidth as a second bandwidth, and allocates the second bandwidth to the fixed terminal. In this way, a bandwidth currently allocated to the fixed terminal can be dynamically adjusted according to a quantity of mobile terminals that request access and subscribed bandwidths of the mobile terminals, thereby avoiding bandwidth waste on the premise of ensuring user experience of the fixed terminal and each mobile terminal.

In the foregoing embodiment, when a mobile terminal requests access, the bandwidth control device allocates a bandwidth greater than the subscribed bandwidth of the fixed terminal to the fixed terminal, for the fixed terminal and the mobile terminal to use. In this case, resources actually used by each mobile terminal may be more than resources subscribed for the mobile terminal with the operator, that is, a bandwidth of the fixed terminal or a bandwidth of another mobile terminal may be preempted, thereby affecting user experience of the fixed terminal or the another mobile terminal. Therefore, optionally, the bandwidth control method in the foregoing embodiment further includes:

207. The bandwidth control device controls a bandwidth, which each of all mobile terminals is allowed to use, to be a subscribed bandwidth of the mobile terminal; alternatively, the bandwidth control device controls the sum of bandwidths, which all mobile terminals are allowed to use, to be a difference between the second bandwidth and the subscribed bandwidth of the fixed terminal.

When a mobile terminal requests to access the Internet by using the home gateway of the fixed terminal, the operator allocates a subscribed bandwidth of the mobile terminal to the mobile terminal according to an agreement signed between the mobile terminal and the operator. However, when each mobile terminal accesses the Internet by using the home gateway of the fixed terminal, a resource that each mobile terminal can use is the bandwidth allocated by the operator to the fixed terminal, that is, the second bandwidth. Therefore, the bandwidth control device limits a bandwidth of each mobile terminal, so that a bandwidth that each mobile terminal can use is the subscribed bandwidth of each mobile terminal. Alternatively, the bandwidth control device may not limit the bandwidth of each mobile terminal, and instead, limits a total bandwidth used by all the mobile terminals, so that the total bandwidth that all the mobile terminals can use together is the difference between the second bandwidth and the subscribed bandwidth of the fixed terminal, that is, the total bandwidth that all the mobile terminals can use together is the first bandwidth, or the total bandwidth that all the mobile terminals can use together is the sum of the first bandwidth and the redundant bandwidth.

In this way, each mobile terminal can be prevented from preempting the subscribed bandwidth originally allocated by the bandwidth control device to the fixed terminal, thereby avoiding impact of the mobile terminal on user experience of the fixed terminal.

In this embodiment, the bandwidth control device needs to separately obtain the subscribed bandwidth of the fixed terminal and the subscribed bandwidth of each mobile terminal. In a practical application, multiple methods are available to obtain the subscribed bandwidth of the fixed terminal and the subscribed bandwidth of each mobile terminal. The following describes a bandwidth control method in an embodiment of the present application.

Figure 3:
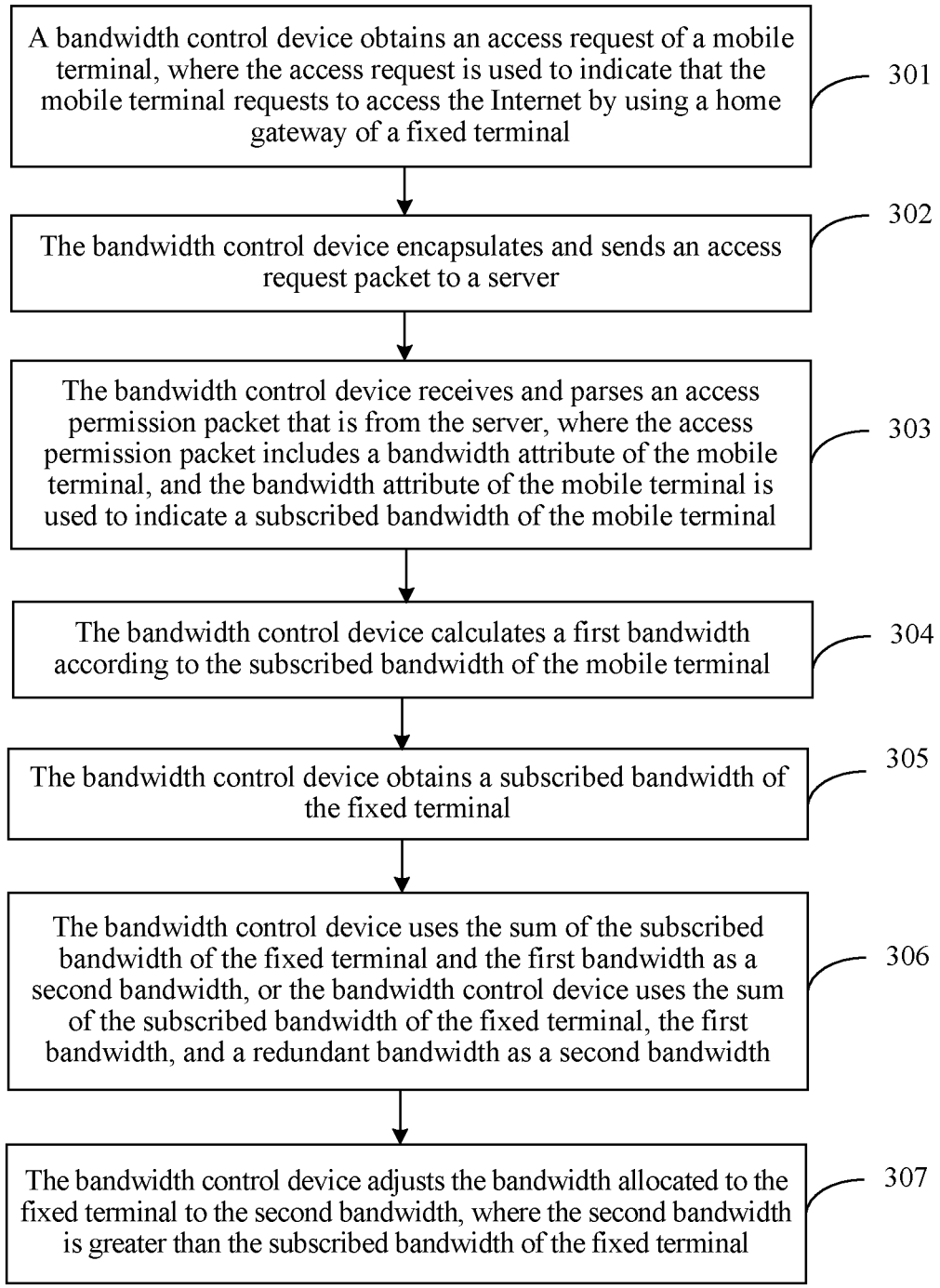
FIG. 3 is a flowchart of a bandwidth control method according to another embodiment of the present application.

Referring to FIG. 3, a bandwidth control method in another embodiment of the present application includes:

301. A bandwidth control device obtains an access request of a mobile terminal, where the access request is used to indicate that the mobile terminal requests to access the Internet by using a home gateway of a fixed terminal.

In this embodiment, the bandwidth control device may be a device used by an operator for bandwidth control. A public Wi-Fi hotspot of the operator is added to the home gateway of the fixed terminal. That is, the home gateway may return Wi-Fi data of a mobile user to a Wi-Fi offload gateway of the operator by using a fixed broadband access network, and then the Wi-Fi data is sent the Wi-Fi data to the Internet by using the Wi-Fi offload gateway of the operator, so that the mobile terminal can access the Internet by using the home gateway of the fixed terminal. When a mobile terminal needs to access the Internet, the mobile terminal sends an access request to the bandwidth control device, where the access request is used to request to access the Internet by using the home gateway of the fixed terminal. The bandwidth control device obtains the access request of the mobile terminal. One or at least two mobile terminals may request to access the Internet by using the home gateway of the fixed terminal.

For a specific example, when entering a coverage area of the public Wi-Fi hotspot on the home gateway of the fixed terminal, the mobile terminal sends an Extensible Authentication Protocol (Extensible Authentication Protocol, EAP) packet to the bandwidth control device, where the EAP packet is used for network access authentication. The EAP packet is the prior art and therefore is not described in detail herein.

The bandwidth control device triggers an authentication request packet for the mobile terminal, adds an authentication identifier (such as a Media Access Control MAC address of the mobile terminal) to the authentication request packet, and sends the authentication request packet to the mobile terminal, where the authentication request packet includes the EAP packet. The mobile terminal returns an authentication response packet to the bandwidth control device. The authentication response packet carries the authentication identifier and the EAP packet. The bandwidth control device receives the authentication response packet.

Certainly, the foregoing describes only some procedures of interaction between the mobile terminal and the bandwidth control device by using an example and does not impose a limitation.

302. The bandwidth control device encapsulates and sends an access request packet to a server.

The bandwidth control device sends the access request packet to the server, so as to obtain a subscribed bandwidth of the fixed terminal and a subscribed bandwidth of each mobile terminal. Specifically, the server may be a Remote Authentication Dial In User Service (Remote Authentication Dial In User Service, RADIUS) server. Certainly, in a practical application, the server may be another policy control server and is not limited herein.

For example, when the server mentioned in this embodiment is the RADIUS server, the bandwidth control device encapsulates the obtained authentication response packet into a RADIUS access request packet in EAP over RADIUS mode, adds necessary RADIUS attributes such as a calling station identifier and an attribute value of IP for network access (that is, a broadband connection address of the home gateway of the fixed terminal), to the RADIUS access request packet and then sends the RADIUS access request packet to an address of a specified RADIUS server. After receiving and parsing the RADIUS access request packet, the RADIUS server generates a Key Inquirement (Key Inquirement) packet and encapsulates the Key Inquirement packet into a RADIUS access inquirement (Request) packet, and the RADIUS server sends the RADIUS access inquirement packet to the bandwidth control device. After receiving the RADIUS access inquirement packet, the bandwidth control device extracts the Key Inquirement (Key Inquirement) packet, encapsulates the Key Inquirement packet as an EAP inquirement (Request) packet, and sends the EAP inquirement packet to the mobile terminal. After receiving an EAP response packet from the mobile terminal for the EAP inquirement packet, the bandwidth control device encapsulates the EAP response packet into a RADIUS access request packet in EAP over RADIUS mode, adds other RADIUS attributes to the RADIUS access request packet, and sends the RADIUS access request packet to the RADIUS server.

Certainly, the foregoing describes only some procedures of interaction among the mobile terminal, the bandwidth control device, and the server by using an example and does not impose a limitation.

303. The bandwidth control device receives and parses an access permission packet that is from the server, where the access permission packet includes a bandwidth attribute of the mobile terminal, and the bandwidth attribute of the mobile terminal is used to indicate a subscribed bandwidth of the mobile terminal.

After successfully authenticating the mobile terminal, the server obtains the subscribed bandwidth of the mobile terminal according to subscription information of the mobile terminal, encapsulates a value of the subscribed bandwidth of the mobile terminal into the bandwidth attribute in the access permission packet, and sends the access permission packet to the bandwidth control device. The bandwidth control device receives and parses the access permission packet and parses the bandwidth attribute in the access permission packet to obtain the value of the subscribed bandwidth of the mobile terminal.

For a specific example, after successfully authenticating the mobile terminal, the server encapsulates an EAP packet into a RADIUS access permission packet, adds upstream and downstream subscribed bandwidths of the mobile terminal to attribute Offload_Guest_UP_Rate and attribute Offload_Guest_down_Rate respectively according to the subscription information of the mobile terminal, and encapsulates attribute Offload_Guest_UP_Rate and attribute Offload_Guest_down_Rate into the RADIUS access permission packet. After receiving the RADIUS access permission packet, the bandwidth control device parses the RADIUS access permission packet and extracts each attribute value from the RADIUS access permission packet.

Certainly, the foregoing description is only an example and does not impose a limitation.

304. The bandwidth control device calculates a first bandwidth according to the subscribed bandwidth of the mobile terminal.

When adjusting the bandwidth allocated to the fixed terminal, the bandwidth control device needs to calculate the first bandwidth with reference to the subscribed bandwidth of each mobile terminal and then calculates a second bandwidth according to the first bandwidth and the subscribed bandwidth of the fixed terminal, so as to ensure user experience of the fixed terminal, avoid excessively occupying, by the mobile terminal, broadband connections of the fixed terminal due to a relatively large subscribed bandwidth of the mobile terminal or a relatively large quantity of mobile terminals, and ensure user experience of the mobile terminal.

Multiple methods are available for the bandwidth control device to calculate a first bandwidth according to subscribed bandwidths of all mobile terminals. For a specific example, the bandwidth control device selects a maximum subscribed bandwidth among the subscribed bandwidths of all the mobile terminals as the first bandwidth; alternatively, the bandwidth control device uses a weighted value of the subscribed bandwidths of all the mobile terminals as the first bandwidth. Certainly, the foregoing methods are used as examples only and do not impose a limitation.

Multiple methods are also available for the bandwidth control device to use the weighted value of the subscribed bandwidths of all the mobile terminals as the first bandwidth. For example, the bandwidth control device uses the sum of the subscribed bandwidths of all the mobile terminals as the first bandwidth. In a practical application, a maximum bandwidth used by each mobile terminal at the same time is not necessarily a subscribed bandwidth of the mobile terminal. Therefore, the first bandwidth may not necessarily be the sum of the subscribed bandwidths of all the mobile terminals but may be less than the sum of the subscribed bandwidths of all the mobile terminals, that is, weighted values of subscribed bandwidths of at least some mobile terminals may be less than 1. Therefore, an average value of the subscribed bandwidths of all the mobile terminals may be used as the first bandwidth; alternatively, all the mobile terminals are graded according to the subscribed bandwidths of all the mobile terminals, and a weighted value of each mobile terminal is determined according to a grade of the mobile terminal, where a mobile terminal with a higher grade has a larger weighted value. In this way, waste caused because bandwidth resources of the operator are not used can be avoided.

305. The bandwidth control device obtains a subscribed bandwidth of the fixed terminal.

The bandwidth control device searches, according to an agreement signed between the fixed terminal and the operator, for the subscribed bandwidth allocated by the operator to the home gateway of the fixed terminal.

For a specific example, when parsing the RADIUS access permission packet, the bandwidth control device obtains the fixed terminal to which the mobile terminal is hosted, obtains the subscribed bandwidth of the fixed terminal by searching a broadband access user information table, then records upstream and downstream subscribed bandwidth values of the fixed terminal into attribute Offload_Host_UP_Rate and attribute Offload_Host_Down_Rate respectively, and encapsulates the two attributes and the original RADIUS attributes as a RADIUS access permission packet.

In a practical application, the RADIUS access permission packet has multiple formats. For example, in the RADIUS access permission packet, an attribute packet type code is 26, a capacity packet length is variable, a vendor identifier is a network management code of a vendor, and a child attribute code may be planned and defined by the vendor. For a specific example, a type value of attribute Offload_Host_UP_Rate is 251, a type value of attribute Offload_Host_Down_Rate is 252, a type value of attribute Offload_Guest_UP_Rate is 253, and a type value of attribute Offload_Guest_Down_Rate is 254. A child attribute length is 16 bits, a bandwidth value is variable, and a bandwidth unit is Kbps. In this case, a terminal vendor type, which is a RADIUS attribute type, is used for the RADIUS attributes to facilitate self-defining by the vendor, and the following four attributes can be distinguished according to type values defined by the vendor: attribute Offload_Host_UP_Rate, attribute Offload_Host_Down_Rate, attribute Offload_Guest_UP_Rate, and attribute Offload_Guest_Down_Rate.

306. The bandwidth control device uses the sum of the subscribed bandwidth of the fixed terminal and the first bandwidth as a second bandwidth, or the bandwidth control device uses the sum of the subscribed bandwidth of the fixed terminal, the first bandwidth, and a redundant bandwidth as a second bandwidth.

After obtaining the first bandwidth by calculation according to the subscribed bandwidths of all the mobile terminals, the bandwidth control device calculates the sum of the subscribed bandwidth of the fixed terminal and the first bandwidth, where the sum is used as the second bandwidth for adjusting the bandwidth of the fixed terminal In a practical application, the bandwidth control device may further add an extra bandwidth and allocate the extra bandwidth to the fixed terminal, that is, calculate the sum of the subscribed bandwidth of the fixed terminal, the first bandwidth, and the redundant bandwidth, and use the sum as the second bandwidth to adjust the bandwidth of the fixed terminal, so as to ensure user experience of each mobile terminal when a relatively large quantity of mobile terminals request access, where the redundant bandwidth may be preset by the bandwidth control device.

307. The bandwidth control device adjusts a bandwidth allocated to the fixed terminal from the subscribed bandwidth of the fixed terminal to the second bandwidth, where the second bandwidth is greater than the subscribed bandwidth of the fixed terminal.

When a mobile terminal requests access, the bandwidth control device adjusts, according to the subscribed bandwidth of the fixed terminal after obtaining the subscribed bandwidth of the fixed terminal, the bandwidth allocated to the fixed terminal, that is, the bandwidth control device adjusts the bandwidth allocated to the fixed terminal from the subscribed bandwidth of the fixed terminal to the second bandwidth, where the second bandwidth is greater than the subscribed bandwidth of the fixed terminal. The bandwidth control device adjusts the bandwidth allocated to the fixed terminal back to the subscribed bandwidth of the fixed terminal when no mobile terminal requests access.

In this embodiment, when a mobile terminal requests to access the Internet in a wireless manner by using a home gateway of a fixed terminal, a bandwidth allocated to the fixed terminal is dynamically adjusted, so that a bandwidth allocated to the fixed terminal is greater than the subscribed bandwidth of the fixed terminal, thereby reducing impact of mobile terminal user access on experience of a user that uses the fixed terminal In addition, compared with a solution of allocating a bandwidth greater than a subscribed bandwidth of a fixed terminal to the fixed terminal over a long period of time, the solution of this embodiment avoids bandwidth waste caused on an access network of an operator when no mobile terminal performs accessing.

For ease of understanding, the following describes the bandwidth control method in this embodiment by using a practical application scenario.

When entering a coverage area of a public Wi-Fi hotspot on a home gateway of a fixed terminal, a mobile terminal sends an Extensible Authentication Protocol (Extensible Authentication Protocol, EAP) packet, where the EAP packet is used for network access authentication. The home gateway triggers an authentication request packet for the new access user, adds an authentication identifier (such as a MAC address of the mobile terminal) to the authentication request packet, and sends the authentication request packet to the mobile terminal, where the authentication request packet includes the EAP packet. The mobile terminal returns an authentication response packet to the home gateway, where the authentication response packet carries the authentication identifier, and the authentication response packet includes the EAP packet.

The home gateway encapsulates the authentication response packet sent by the mobile terminal into a RADIUS access request packet in EAP over RADIUS mode, where the RADIUS access request packet further includes some RADIUS attributes, such as a calling station identifier and an attribute value of IP for network access (that is, a broadband connection address of the home gateway of the fixed terminal). An IP address of the fixed terminal of the home gateway is used as a source address of the RADIUS access request packet, and an address of a specified RADIUS server is used as a destination address for sending the RADIUS access request packet.

A bandwidth access gateway parses the received RADIUS access request packet, records an attribute value of the calling station identifier and the attribute value of IP for network access (that is, the broadband connection address of the home gateway), then re-encapsulates the source address and the destination address of the RADIUS access request packet, where the source address is an IP address of the broadband access gateway, and the destination address is the address of the specified RADIUS server, and forwards the RADIUS access request packet to a Wi-Fi offload gateway.

After parsing the RADIUS access request packet, the Wi-Fi offload gateway records the attribute value of the calling station identifier and the attribute value of IP for network access, then re-encapsulates the source address and the destination address of the RADIUS access request packet, where the source address is an IP address of the Wi-Fi offload gateway, and the destination address is the address of the specified RADIUS server, and forwards the RADIUS access request packet to the RADIUS server.

The RADIUS server receives and parses the RADIUS access request packet and selects a group of encryption algorithms supported by the RADIUS server from an encryption algorithm list in the EAP packet; the RADIUS server generates a random number, a certificate (including a name of the RADIUS server and a public key), and a certificate request to form a Key Inquirement (Key Inquirement) packet, encapsulates the Key Inquirement packet into a RADIUS access inquirement (request) packet, and sends the RADIUS access inquirement packet to the Wi-Fi offload gateway.

The Wi-Fi offload gateway relays the RADIUS access inquirement packet to the broadband access gateway, and then the broadband access gateway relays the RADIUS access inquirement packet to the home gateway. The home gateway extracts the Key Inquirement (Key Inquirement) packet from the RADIUS access inquirement packet, encapsulates the Key Inquirement packet as an EAP inquirement packet, and sends the EAP inquirement packet to the mobile terminal.

After receiving the EAP inquirement packet, the mobile terminal extracts the public key from the certificate of the RADIUS server, generates a random password string and encrypts the random password string by using the public key of the RADIUS server, and finally encapsulates encrypted information as an EAP access response packet and sends the EAP access response packet to the home gateway.

The home gateway encapsulates the EAP access response packet into the RADIUS access request packet in EAP over RADIUS mode, and then sends the RADIUS access request packet to the broadband access gateway. The broadband access gateway relays the RADIUS access request packet to the Wi-Fi offload gateway, and then the Wi-Fi offload gateway relays the RADIUS access request packet to the RADIUS server.

After successfully authenticating a client, the RADIUS server encapsulates the EAP packet into a RADIUS access permission packet, obtains a subscribed bandwidth of the mobile terminal according to subscription information of the client, adds upstream and downstream bandwidths into attribute Offload_Guest_UP_Rate and attribute Offload_Guest_Down_Rate respectively, encapsulates the two attributes into the RADIUS access permission packet, and sends the RADIUS access permission packet to the Wi-Fi offload gateway.

The Wi-Fi offload gateway parses the RADIUS access permission packet, extracts the RADIUS attributes from the RADIUS access permission packet, records the calling station identifier (that is, the Media Access Control MAC address of the mobile terminal), a value of attribute Offload_Guest_UP_Rate, and a value of attribute Offload_Guest_Down_Rate, and generates a Wi-Fi offload user information table. Then, the Wi-Fi offload gateway relays the RADIUS access permission packet to the broadband access gateway.

The broadband access gateway parses the RADIUS access permission packet, extracts the value of attribute Offload_Guest_UP_Rate and the value of attribute Offload_Guest_Down_Rate, and obtains the IP address of the fixed terminal to which the mobile terminal is hosted. The broadband access gateway obtains information about a subscribed bandwidth of the fixed terminal by searching a broadband access user information table, records upstream and downstream subscribed bandwidth values of the fixed terminal into attribute Offload_Host_UP_Rate and attribute Offload_Host_Down_Rate respectively, and encapsulates the two attributes and the original RADIUS attributes as a RADIUS access permission packet and sends the RADIUS access permission packet to the home gateway. A bandwidth allocated by the broadband access gateway to the fixed terminal during traffic management is adjusted to the sum of the subscribed bandwidth of the fixed terminal and the subscribed bandwidth of the mobile terminal.

The home gateway parses the RADIUS access permission packet, obtains the MAC address of the mobile terminal according to the calling station identifier, obtains the subscribed bandwidth of the mobile terminal user according to the value of attribute Offload_Guest_UP_Rate and the value of attribute Offload_Guest_down_Rate, records these attributes, generates mobile terminal user information, and allocates a corresponding subscribed bandwidth to the mobile terminal during traffic management. The home gateway further obtains the subscribed bandwidth of the fixed terminal according to a value of attribute Offload_Host_UP_Rate and a value of attribute Offload_Host_Down_Rate, generates fixed terminal user information, and allocates the sum of the subscribed bandwidth of the fixed terminal and the subscribed bandwidth of the mobile terminal to the mobile user during traffic management. Finally, the home gateway extracts the EAP packet and sends an authentication success packet to the mobile terminal.

The mobile terminal receives the authentication success packet, successfully performs accessing, starts IP address configuration, and sends a DHCP request packet to the home gateway. After receiving the DHCP request packet, the home gateway encapsulates the received DHCP request packet as an Ethernet over GRE packet and sends the Ethernet over GRE packet to the Wi-Fi offload gateway. The Wi-Fi offload gateway assigns an IP address to the mobile terminal, records the IP address into the Wi-Fi offload user information table, and sends a DHCP response packet to the mobile terminal.

After successfully obtaining the IP address, the mobile terminal can normally access a network. On the home gateway, the home gateway performs class-based Weighted Fair Queuing (Weighted Fair Queuing, WFQ) scheduling separately on Wi-Fi offload traffic and fixed terminal user traffic, thereby ensuring respective allocated bandwidths. On the broadband access gateway, after the bandwidth allocated to the fixed terminal is adjusted dynamically, a total bandwidth allocated to the mobile terminal and the fixed terminal can be ensured.

Figure 4:
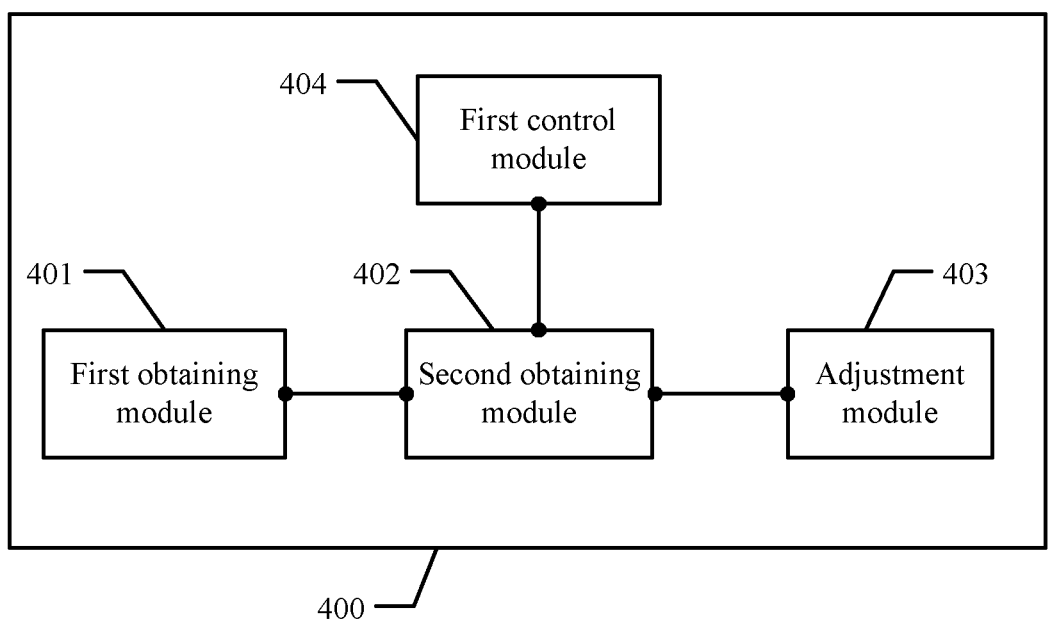
FIG. 4 is a schematic diagram of a bandwidth control device according to an embodiment of the present application.

The foregoing describes the bandwidth control methods in the embodiments of the present application. The following describes a bandwidth control device in an embodiment of the present application. Referring to FIG. 4, a bandwidth control device 400 in an embodiment of the present application includes:

a first obtaining module 401, configured to obtain an access request of a mobile terminal, where the access request is used to indicate that the mobile terminal requests to access the Internet by using a home gateway of a fixed terminal;

a second obtaining module 402, configured to obtain a subscribed bandwidth of the fixed terminal; and an adjustment module 403, configured to adjust a bandwidth allocated to the fixed terminal from the subscribed bandwidth of the fixed terminal to a second bandwidth, where the second bandwidth is greater than the subscribed bandwidth of the fixed terminal.

In this embodiment, when a mobile terminal requests to access the Internet in a wireless manner by using a home gateway of a fixed terminal, an adjustment module dynamically adjusts a bandwidth allocated to the fixed terminal, so that a bandwidth allocated to the fixed terminal is greater than the subscribed bandwidth of the fixed terminal, thereby reducing impact of mobile terminal user access on experience of a user that uses the fixed terminal In addition, compared with a solution of allocating a bandwidth greater than a subscribed bandwidth of a fixed terminal to the fixed terminal over a long period of time, the solution of this embodiment avoids bandwidth waste caused on an access network of an operator when no mobile terminal performs accessing.

In the foregoing embodiment, when a mobile terminal requests access, the bandwidth allocated by the bandwidth control device to the fixed terminal is greater than the subscribed bandwidth of the fixed terminal; in this case, resources actually used by the fixed terminal may be more than resources subscribed for the fixed terminal with the operator, that is, a bandwidth of the accessed mobile terminal may be preempted, thereby affecting user experience of the mobile terminal. Therefore, optionally, the bandwidth control device 400 in the foregoing embodiment further includes:

a first control module 404, configured to control a bandwidth, which the fixed terminal is allowed to use, to be the subscribed bandwidth of the fixed terminal.

In this way, the fixed terminal can be prevented from preempting a bandwidth originally allocated by the bandwidth control device to the mobile terminal, thereby avoiding impact of the fixed terminal on user experience of the mobile terminal.

In the foregoing embodiment, the bandwidth control device adjusts the bandwidth allocated to the fixed terminal to the second bandwidth. In a practical application, multiple methods are available to calculate the second bandwidth. The following describes a bandwidth control device in an embodiment of the present application.

Figure 5:
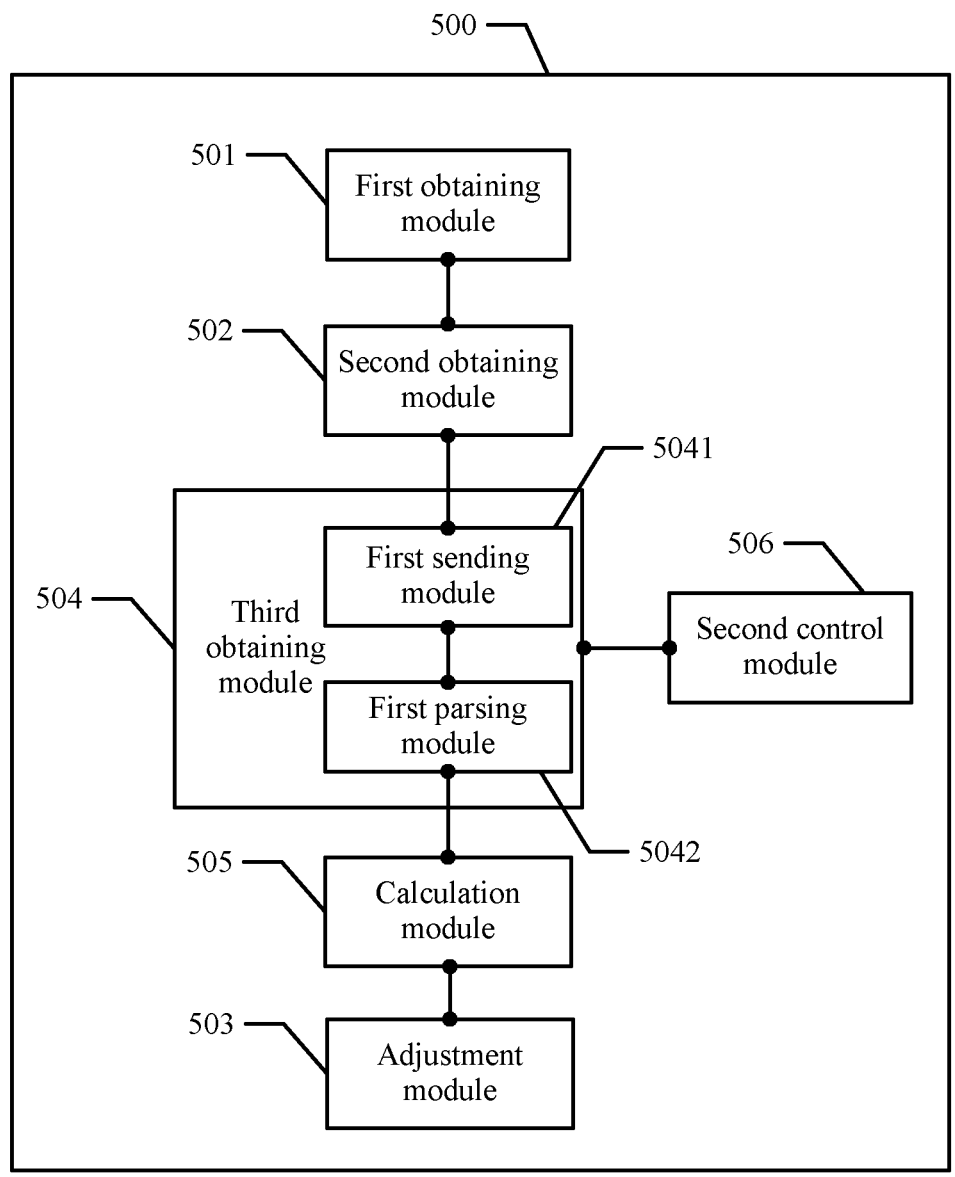
FIG. 5 is a schematic diagram of a bandwidth control device according to another embodiment of the present application.

Referring to FIG. 5, a bandwidth control device 500 in another embodiment of the present application includes:

a first obtaining module 501, configured to obtain an access request of a mobile terminal, where the access request is used to indicate that the mobile terminal requests to access the Internet by using a home gateway of a fixed terminal;

a second obtaining module 502, configured to obtain a subscribed bandwidth of the fixed terminal; and an adjustment module 503, configured to adjust a bandwidth allocated to the fixed terminal from the subscribed bandwidth of the fixed terminal to a second bandwidth, where the second bandwidth is greater than the subscribed bandwidth of the fixed terminal.

Further, the bandwidth control device 500 further includes:

a third obtaining module 504, configured to obtain a subscribed bandwidth of each mobile terminal; and a calculation module 505, configured to calculate a first bandwidth according to the subscribed bandwidths of all the mobile terminals.

The second bandwidth is the sum of the subscribed bandwidth of the fixed terminal and the first bandwidth or the sum of the subscribed bandwidth of the fixed terminal, the first bandwidth, and a redundant bandwidth.

In this embodiment, when a mobile terminal requests to access the Internet in a wireless manner by using a home gateway of a fixed terminal, an adjustment module dynamically adjusts a bandwidth allocated to the fixed terminal, so that a bandwidth allocated to the fixed terminal is greater than the subscribed bandwidth of the fixed terminal, thereby reducing impact of mobile terminal user access on experience of a user that uses the fixed terminal In addition, compared with a solution of allocating a bandwidth greater than a subscribed bandwidth of a fixed terminal to the fixed terminal over a long period of time, the solution of this embodiment avoids bandwidth waste caused on an access network of an operator when no mobile terminal performs accessing.

Further, the bandwidth control device calculates a first bandwidth according to subscribed bandwidths of all mobile terminals, uses the sum of the first bandwidth and the subscribed bandwidth of the fixed terminal or the sum of the first bandwidth, the subscribed bandwidth of the fixed terminal, and a redundant bandwidth as a second bandwidth, and allocates the second bandwidth to the fixed terminal. In this way, a bandwidth currently allocated to the fixed terminal can be dynamically adjusted according to a quantity of mobile terminals that request access and subscribed bandwidths of the mobile terminals, thereby avoiding bandwidth waste on the premise of ensuring user experience of the fixed terminal and each mobile terminal.

In the foregoing embodiment, the calculation module 505 is configured to calculate the first bandwidth according to the subscribed bandwidths of all the mobile terminals. In a practical application, multiple methods are available for the calculation module to calculate the first bandwidth according to the subscribed bandwidths of all the mobile terminals. Alternatively, the calculation module 505 is specifically configured to select a maximum subscribed bandwidth of a mobile terminal among the subscribed bandwidths of all the mobile terminals as the first bandwidth, or the calculation module 505 is specifically configured to use a weighted value of the subscribed bandwidths of all the mobile terminals as the first bandwidth. In this way, waste caused because bandwidth resources of the operator are not used can be avoided.

In the foregoing embodiment, when a mobile terminal requests access, the bandwidth control device allocates a bandwidth greater than the subscribed bandwidth of the fixed terminal to the fixed terminal, for the fixed terminal and the mobile terminal to use. In this case, resources actually used by each mobile terminal may be more than resources subscribed for the mobile terminal with the operator, that is, a bandwidth of the fixed terminal or a bandwidth of another mobile terminal may be preempted, thereby affecting user experience of the fixed terminal or the another mobile terminal. Therefore, optionally, the bandwidth control device 500 in the foregoing embodiment further includes:

a second control module 506, configured to control a bandwidth, which each of all the mobile terminals is allowed to use, to be the subscribed bandwidth of the mobile terminal, or configured to control the sum of bandwidths, which all the mobile terminals are allowed to use, to be a difference between the second bandwidth and the subscribed bandwidth of the fixed terminal.

In this way, each mobile terminal can be prevented from preempting the subscribed bandwidth originally allocated by the bandwidth control device to the fixed terminal, thereby avoiding impact of the mobile terminal on user experience of the fixed terminal.

In the foregoing embodiment, the bandwidth control device needs to separately obtain the subscribed bandwidth of the fixed terminal and the subscribed bandwidth of each mobile terminal. In a practical application, multiple methods are available to obtain the subscribed bandwidth of the fixed terminal and the subscribed bandwidth of each mobile terminal.

Optionally, the third obtaining module 504 in the bandwidth control device 500 in the foregoing embodiment further includes:

a first sending module 5041, configured to encapsulate and send an access request packet to a server; and a first parsing module 5042, configured to receive and parse an access permission packet that is from the server, where the access permission packet includes a bandwidth attribute of the mobile terminal, and the bandwidth attribute of the mobile terminal is used to indicate the subscribed bandwidth of the mobile terminal.

Figure 6:
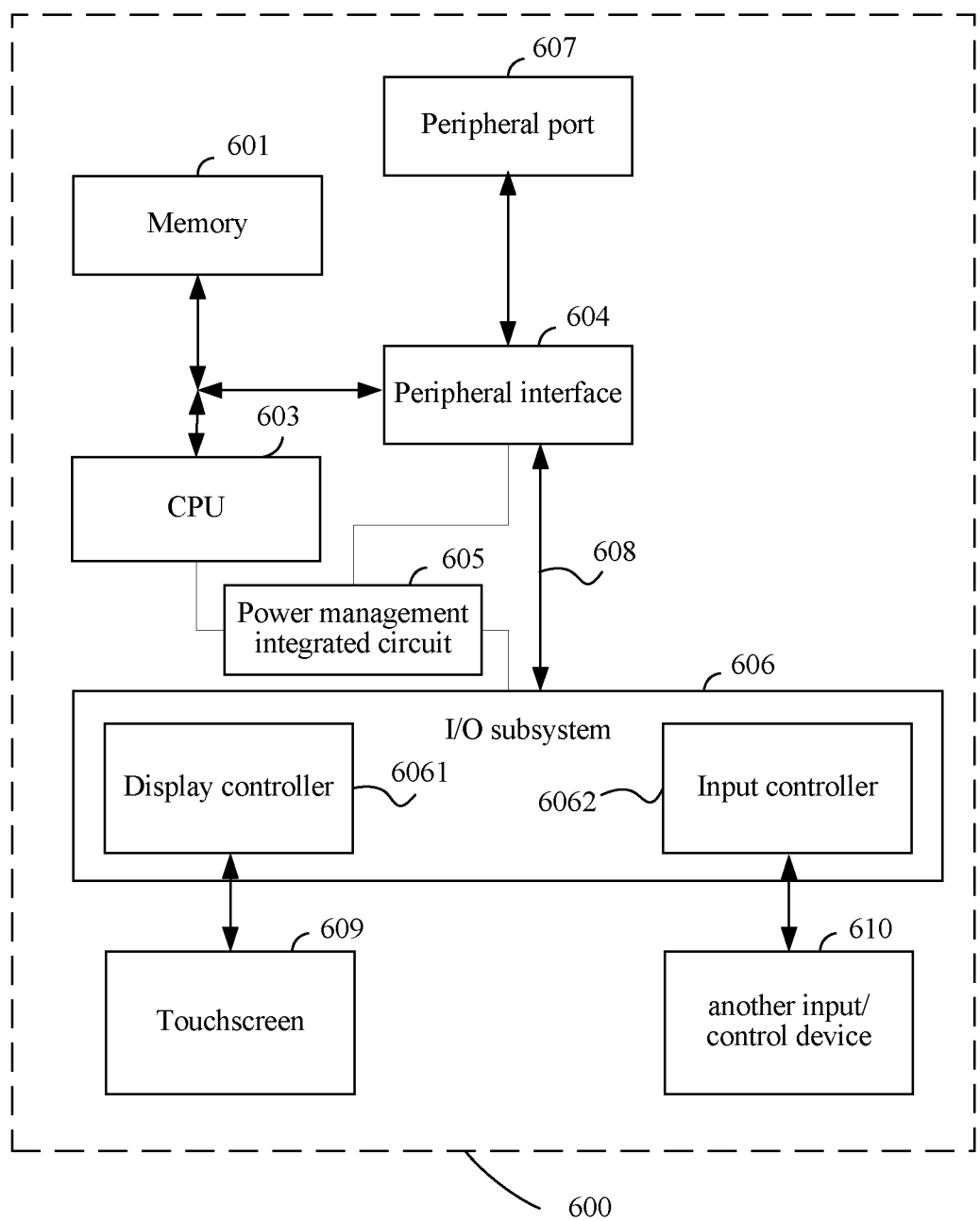
FIG. 6 is a schematic diagram of a bandwidth control device according to another embodiment of the present application.

The foregoing describes the bandwidth control devices in the embodiments of the present application from a perspective of a functional entity as a unit. The following describes a bandwidth control device in an embodiment of the present application from a perspective of hardware processing. Referring to FIG. 6, FIG. 6 is a schematic structural diagram of a bandwidth control device in another embodiment of the present application.

It should be understood that a bandwidth control device 600 shown in FIG. 6 is merely an example of the bandwidth control device provided in either of the embodiments illustrated in FIG. 4 and FIG. 5, and the bandwidth control device 600 may include parts fewer or more than those shown in FIG. 6, where two or more parts may be combined, or parts disposed differently may be included. Various parts shown in the figure may be implemented in hardware that includes one or more signal processing circuits and/or application-specific integrated circuits, software, or a combination of hardware and software.

Specific description is provided herein by using the bandwidth control device as an example. As shown in FIG. 6, the bandwidth control device includes: a memory 601, a central processing unit (Central Processing Unit, CPU for short) 603, a peripheral interface 604, a power management integrated circuit 605, an input/output (I/O) subsystem 606, and a peripheral port 607. These parts communicate with each other by using one or more communications buses or signal cables 608.

The following describes in detail the bandwidth control device 600 provided in this embodiment.

Memory 601: The memory 601 may be accessed by the CPU 603 and the peripheral interface 604, and the memory 601 may include a high-speed random access memory and may also include a non-volatile memory, for example, one or more disk storage components, flash memory components, or other volatile solid-state storage components.

Peripheral interface 604: The peripheral interface may connect input and output peripherals on the device to the CPU 603 and the memory 601.

Input/output (I/O) subsystem 606: The I/O subsystem 606 may connect the input and output peripherals, such as a touchscreen 609 and another input/control device 610, on the device to the peripheral interface 604. The I/O subsystem 606 may include a display controller 6061 and one or more input controllers 6062 configured to control the another input/control device 610. The one or more input controllers 6062 receive an electrical signal from the another input/control device 610 or send an electrical signal to the another input/control device 610, and the another input/control device 610 may include a physical button (such as a press button and a rocker button), a dial, a slider switch, a joystick, and a click scroll wheel. It should be noted that the input controller 6062 may connect to any one of the following: a keyboard, an infrared port, a USB interface, and a pointing device such as a mouse.

The display controller 6061 in the I/O subsystem 606 receives an electrical signal from the touchscreen 609 or sends an electrical signal to the touchscreen 609. The touchscreen 609 detects touch on the touchscreen, and the display controller 6061 converts the detected touch into interaction with a navigation device interface object displayed on the touchscreen 609, that is, implementing man-machine interaction, where the navigation device interface object displayed on the touchscreen 609 may be an icon for running a game, an icon connecting to a corresponding network, or the like. It should be noted that the device may further include an optical mouse, where the optical mouse is a touch-sensitive surface that does not display visual output or an extension of a touch-sensitive surface that is formed by the touchscreen.

The power management integrated circuit 605 is configured to perform power supply and power management for hardware connected to the CPU, the I/O subsystem, and the peripheral interface.

Figure 7:
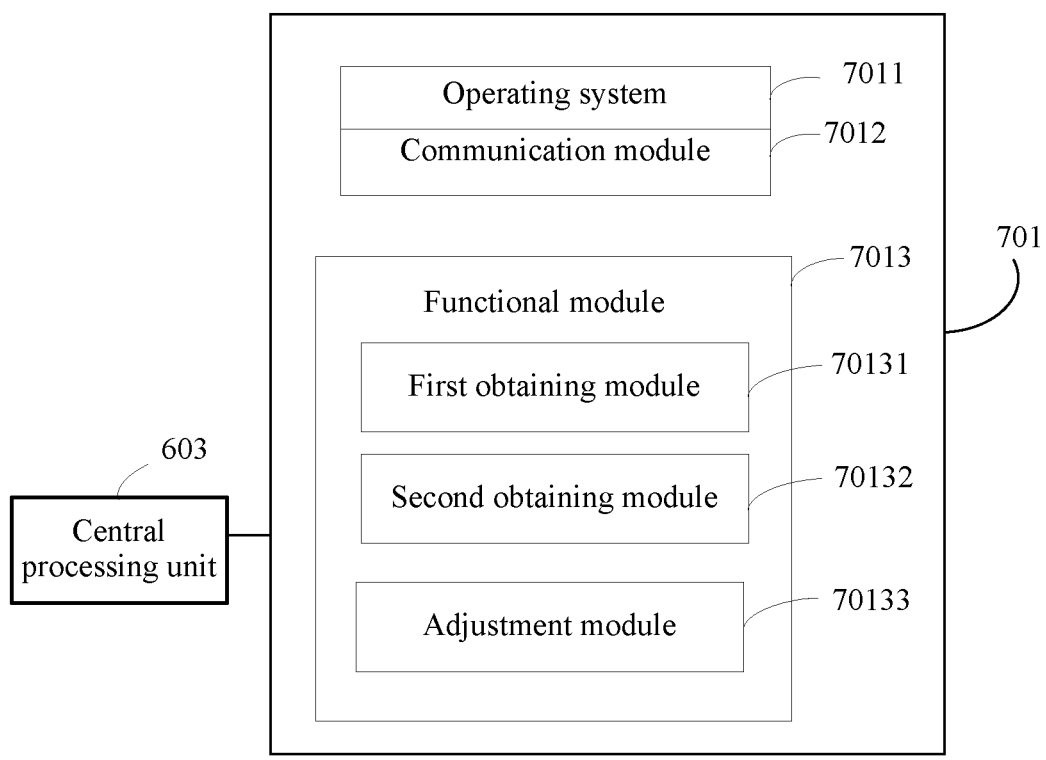
FIG. 7 is a structural diagram of an inner part of a bandwidth control device.

FIG. 7 is a structural diagram of an inner part of a bandwidth control device. In an embodiment of the present application, a software part stored in a memory 701 may include an operating system 7011, a communication module 7012, and a functional module 7013.

The operating system 7011 (for example, Darwin, RTXC, LINUX, UNIX, OSX, WINDOWS, or an embedded operating system such as VxWorks) includes various software components and/or drivers configured to control and manage general system tasks (for example, memory management, storage device control, and electricity management), and facilitates communication between various hardware and software components.

The communication module 7012 is configured to communicate with another device by using one or more peripheral ports and further includes various software components that are configured to process data received by an RF circuit and/or a peripheral port.

The functional module 7013 includes:

a first obtaining module 70131, configured to obtain an access request of a mobile terminal, where the access request is used to indicate that the mobile terminal requests to access the Internet by using a home gateway of a fixed terminal;

a second obtaining module 70132, configured to obtain a subscribed bandwidth of the fixed terminal; and an adjustment module 70133, configured to adjust a bandwidth allocated to the fixed terminal from the subscribed bandwidth of the fixed terminal to a second bandwidth, where the second bandwidth is greater than the subscribed bandwidth of the fixed terminal.

Specifically, in this embodiment, the functional module 7013 circuit further includes:

a first control module, configured to control a bandwidth, which the fixed terminal is allowed to use, to be the subscribed bandwidth of the fixed terminal.

Specifically, in this embodiment, the functional module 7013 circuit further includes:

a third obtaining module, configured to obtain a subscribed bandwidth of each mobile terminal; and a calculation module, configured to calculate a first bandwidth according to the subscribed bandwidths of all the mobile terminals.

The second bandwidth is the sum of the subscribed bandwidth of the fixed terminal and the first bandwidth or the sum of the subscribed bandwidth of the fixed terminal, the first bandwidth, and a redundant bandwidth.

Specifically, in this embodiment, the calculation module is specifically configured to select a maximum subscribed bandwidth of a mobile terminal among the subscribed bandwidths of all the mobile terminals as the first bandwidth; or the calculation module is specifically configured to use a weighted value of the subscribed bandwidths of all the mobile terminals as the first bandwidth.

Specifically, in this embodiment, the functional module 7013 circuit further includes:

a second control module, configured to control a bandwidth, which each of all the mobile terminals is allowed to use, to be the subscribed bandwidth of the mobile terminal, or configured to control the sum of bandwidths, which all the mobile terminals are allowed to use, to be a difference between the second bandwidth and the subscribed bandwidth of the fixed terminal.

Specifically, in this embodiment, the third obtaining module includes:

a first sending module, configured to encapsulate and send an access request packet to a server; and a first parsing module, configured to receive and parse an access permission packet that is from the server, where the access permission packet includes a bandwidth attribute of the mobile terminal, and the bandwidth attribute of the mobile terminal is used to indicate the subscribed bandwidth of the mobile terminal.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method of bandwidth control, comprising:
obtaining, by a bandwidth control device on premises of a first user, an access request, from a mobile terminal of a second user outside the premises, requesting access to the Internet via a home gateway of a fixed terminal on the premises;
obtaining, by the bandwidth control device, a first subscribed bandwidth of the fixed terminal;
adjusting, by the bandwidth control device, an allocated bandwidth of the fixed terminal from the first subscribed bandwidth of the fixed terminal to an increased bandwidth greater than the first subscribed bandwidth of the fixed terminal; and
providing Internet access to the mobile terminal of the second user while outside the premises.

2. The method according to claim 1, further comprising:
controlling, by the bandwidth control device, a first permitted bandwidth, which the fixed terminal is allowed to use, to be the first subscribed bandwidth of the fixed terminal; and
providing the access to the Internet to the mobile terminal of the second user at no more than a second bandwidth equal to a difference between the increased bandwidth and the first subscribed bandwidth.

3. The method according to claim 1, further comprising:
obtaining, by the bandwidth control device, a second subscribed bandwidth of each of a plurality of mobile terminals;
calculating, by the bandwidth control device, a first bandwidth according to the second subscribed bandwidth of each of the mobile terminals; and
determining, by the bandwidth control device, a first sum of the first subscribed bandwidth of the fixed terminal and the first bandwidth as the increased bandwidth, or a second sum of the first subscribed bandwidth of the fixed terminal, the first bandwidth, and a second bandwidth as the increased bandwidth.

4. The method according to claim 3, wherein the calculating, by the bandwidth control device, of the first bandwidth comprises:
selecting, by the bandwidth control device, a maximum subscribed bandwidth of all the mobile terminals as the first bandwidth;
or
calculating, by the bandwidth control device, a third sum of a weighted value of the second subscribed bandwidth of each of the mobile terminals as the first bandwidth.

5. The method according to claim 3, further comprising:
controlling, by the bandwidth control device, a second permitted bandwidth, which each of the mobile terminals is allowed to use, to be the second subscribed bandwidth of the mobile terminal;
or
controlling, by the bandwidth control device, the sum of bandwidths, which all the mobile terminals are allowed to use, to be a difference between the second bandwidth and the first subscribed bandwidth of the fixed terminal.

6. The bandwidth control method according to claim 3, wherein the obtaining, by the bandwidth control device, of the second subscribed bandwidth of each mobile terminal comprises:
encapsulating and sending, by the bandwidth control device, an access request packet to a server; and
receiving and parsing, by the bandwidth control device, an access permission packet from the server, the access permission packet including a bandwidth attribute, of one of the mobile terminals, indicating the second subscribed bandwidth of the one of the mobile terminals.

7. The bandwidth control method according to claim 6, wherein the server is a Remote Authentication Dial In User Service (RADIUS) server.

8. The method according to claim 1, wherein the adjusting is performed automatically without requiring user input.

9. A bandwidth control device controlling a supplied bandwidth to a fixed terminal via a home gateway, both located within premises of a first user and to at least one mobile terminal of at least one second user outside the premises, comprising:
a peripheral interface configured to obtain an access request from the at least one mobile terminal, the access request requesting access to the Internet via the home gateway of the fixed terminal; and
at least one processor configured to obtain a first subscribed bandwidth of the fixed terminal and to adjust the supplied bandwidth allocated to the fixed terminal from the first subscribed bandwidth of the fixed terminal to an increased bandwidth greater than the first subscribed bandwidth of the fixed terminal.

10. The bandwidth control device according to claim 9, wherein the at least one processor is further configured to control a first permitted bandwidth, which the fixed terminal is allowed to use, to be the first subscribed bandwidth of the fixed terminal.

11. The bandwidth control device according to claim 9, wherein the at least one mobile terminal is a plurality of mobile terminals, and
wherein the at least one processor is further configured to obtain a second subscribed bandwidth of each of the mobile terminals,
calculate a first bandwidth according to the second subscribed bandwidth of all of the mobile terminals, and
determine the increased bandwidth as a first sum of the first subscribed bandwidth of the fixed terminal and the first bandwidth, or as a second sum of the first subscribed bandwidth of the fixed terminal, the first bandwidth, and a second bandwidth.

12. The bandwidth control device according to claim 11, wherein the at least one processor is specifically configured to one of
select a maximum subscribed bandwidth among all of the mobile terminals as the first bandwidth; and
calculate a third sum of a weighted value of the second subscribed bandwidth of each of the mobile terminals as the first bandwidth.

13. The bandwidth control device according to claim 11, wherein the at least one processor is further configured to
control a second permitted bandwidth, which each mobile terminal is allowed to use, to be the second subscribed bandwidth of the mobile terminal, or
control a third sum of the second permitted bandwidth, which each of the mobile terminals is allowed to use, to be a difference between the increased bandwidth and the first subscribed bandwidth of the fixed terminal.

14. The bandwidth control device according to claim 11, wherein the at least one processor is further configured to
encapsulate and send an access request packet to a server, and
receive and parse an access permission packet from the server, the access permission packet including a bandwidth attribute of one of the mobile terminals, indicating the second subscribed bandwidth of the one of the mobile terminals.

15. The bandwidth control device according to claim 9, wherein the at least one processor is configured to adjust the supplied bandwidth allocated to the fixed terminal automatically without requiring user input.

* * * * *